March 20, 1945.　　W. A. LIPPINCOTT　　2,371,633
ACCUMULATOR
Filed Oct. 23, 1943　　2 Sheets-Sheet 1

INVENTOR
Wells A. Lippincott
By Parker, Carlson, Pitzner & Hubbard
ATTORNEYS

March 20, 1945.  W. A. LIPPINCOTT  2,371,633
ACCUMULATOR
Filed Oct. 23, 1943　　2 Sheets-Sheet 2

INVENTOR
Wells A. Lippincott
By Parker, Carlson, Pitzner & Hubbard
ATTORNEYS

Patented Mar. 20, 1945

2,371,633

UNITED STATES PATENT OFFICE 2,371,633

ACCUMULATOR

Wells A. Lippincott, Evanston, Ill., assignor to Ideal Roller & Manufacturing Company, Chicago, Ill., a corporation of Illinois Application October 23, 1943, Serial No. 507,439

10 Claims. (Cl. 138—30)

This invention relates to hydraulic accumulators of the type in which the bladder or diaphragm separates bodies of liquid and compressed air within the tank, and has more particular reference to such accumulators in which a seal around the bag neck is maintained by the internal pressure within the bag.

One object is to distribute the sealing pressure in a novel manner so as to maintain the seal effective under all of the conditions encountered in service use.

Another object is to provide a novel seal of the above character in which only part of the available clamping force is utilized whereby to avoid possible damage to the engaged part of the diaphragm.

Another object is to provide a novel means for holding the parts in assembled relation before the internal pressure is applied to effect the seal.

Other objects and advantages of the invention will become apparent from the following detailed description taken in connection with the accompanying drawings, in which Figure 1 is a fragmentary diagrammatic cross-section through the head end of an accumulator embodying the present invention.

Figure 1:
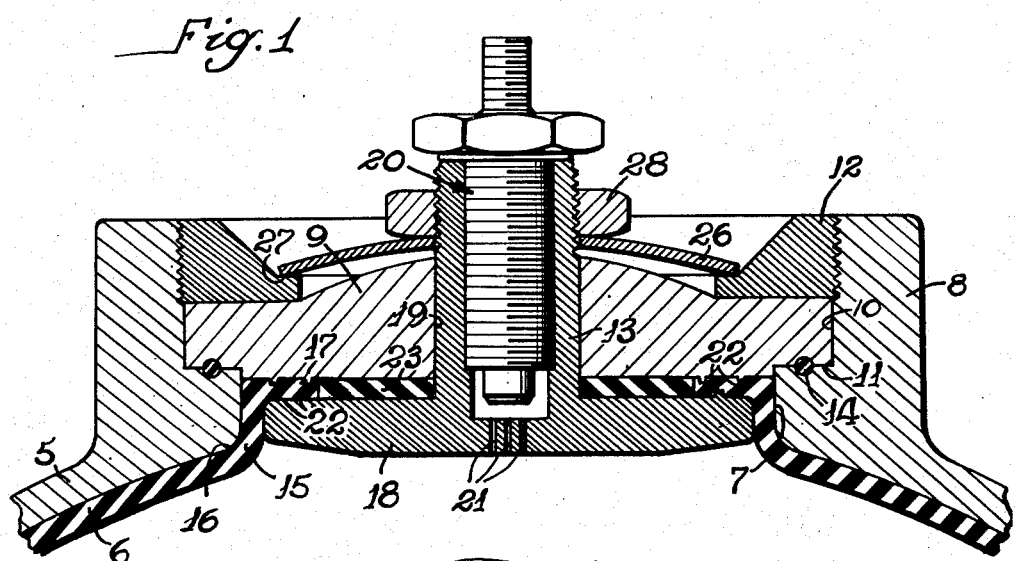
Figure 2:
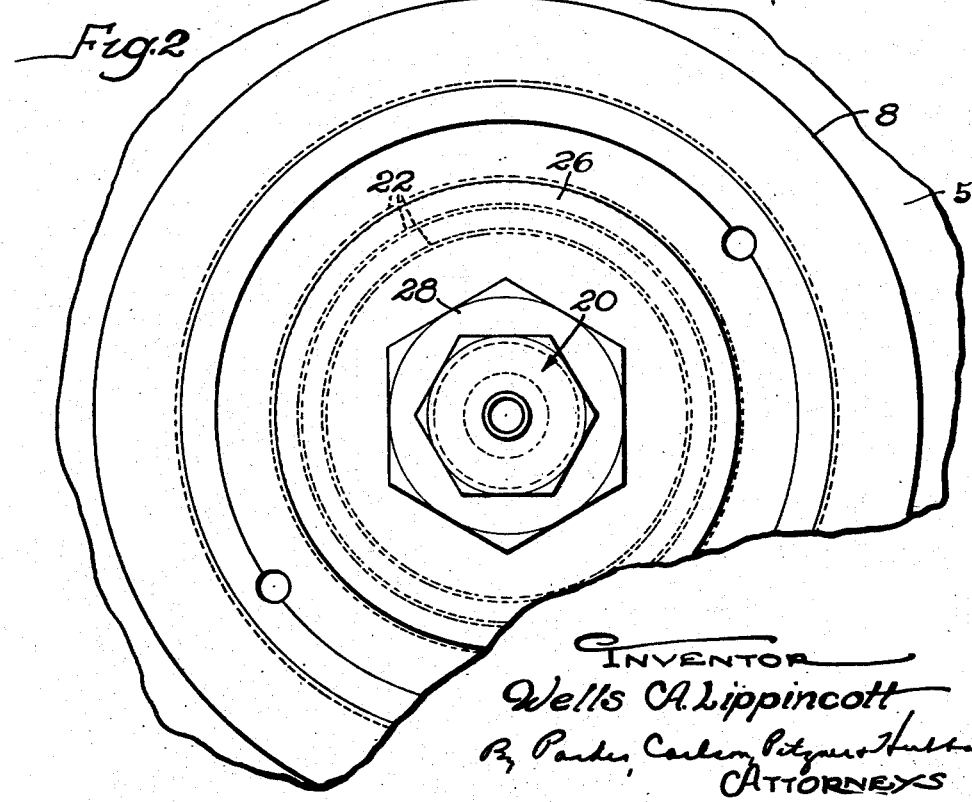
Fig. 2 is a fragmentary plan view.

While the invention is susceptible of various modifications and alternative constructions, I have shown in the drawings and will herein describe in detail the preferred embodiments. It is to be understood, however, that I do not intend to limit the invention by such disclosure but aim to cover all modifications and alternative constructions falling within the spirit and scope of the invention as expressed in the appended claims.

In the drawings the invention is incorporated for purposes of illustration in an accumulator comprising a rigid tank 5 adapted to contain fluid maintained under pressure by air compressed within a bladder or diaphragm 6 molded of yieldable material such as a synthetic rubber compound which is relatively highly plasticized so as to be capable of withstanding low temperatures. The bladder is inserted through an opening 7 defined by a flanged head 8 of the tank.

The tank opening is closed by a cover in the form of a disk 9 the periphery of which overlies the bottom 11 of a counterbore 10 in the head 8 and is clamped against the latter by a ring 12 screwed into the head. Preferably, a standard sealing ring 14 is disposed in grooves around the ledge 11 and the opposed under surface of the cover.

The neck 15 of the bladder 6 is molded to fit against a rounded corner 16 and the defining wall of the opening 7. It terminates in an inturned flange 17 which is clamped against an annular surface on the tank head facing inwardly and in this instance defined by the bottom of the cover 9. Such clamping is effected by a disk 18 bearing against the inwardly facing surfaces of the neck flange 17 and movably mounted on the cover 9 so as to act as a piston when subjected to the internal pressure maintained in the tank. For this purpose, the disk 18 is formed with a hollow central hub 13 which projects through a bore 19 in the cover so as to slide axially therein. The radius of the disk 18 is smaller than that of the opening 7 by the thickness of the neck 15. Preferably, the under side of the disk adjacent its periphery is rounded as shown. Air for inflating the bladder is introduced through a standard air valve stem 20 threaded into the outer end of the hub, the air flowing through holes 21 in the disk 18.

The disk 18 being free to move axially and exposed within the bladder will be urged outwardly under substantial pressure which will be applied to the flange 17 to clamp the latter firmly at all times against the cover 9. Thus, although the rubber of which the flange and bladder are composed will shrink many times as much as the metal of the tank when the two are cooled, the air seal formed by clamping of the flange between the cover and the disk will not be destroyed. This is because the excess shrinkage of the rubber will be taken up automatically by movement of the disk 18 under the internal pressure with the result that the clamping force continues to remain applied to the flange. If desired, labyrinth ribs or serrations 22 may be formed on the cover and the disk so as to project into the flange 17 and minimize the possibility of lateral flowing of the rubber.

In accordance with the present invention, auxiliary means is provided to sustain the major portion of the total pressure exerted on the disk 18 so as to avoid unnecessary compression of the flange 17 and possible destruction of the seal. Herein, this means comprises a stop which is engaged by the disk 18 to limit the motion of the latter with the desired clamping pressure applied to the flange 17, the effective position of the stop shifting automatically to accommodate dimensional changes in the thickness of the flange which changes may occur in service use in response to wide temperature variations.

In the form shown in Fig. 1, the stop is defined by the under surface of a ring 23 composed of material which has substantially the same coefficient of thermal expansion as the flange 17 and which is sufficiently resistant to flow to prevent distortion under load. The ring may, for example, be composed of synthetic rubber which is harder or more resistant to lateral flow than the rubber of the flange 17 and, if desired, may be reinforced by fabric or other means. Herein, the ring fits snugly around the hub 13 and is disposed within the flange 17 and between the cover and the disk 18. In this instance, it is made thinner, by a few thousandths of an inch, than the initial thickness of the flange 17 so that initial clamping force is applied to the flange.

As the internal air pressure is applied to the disk 18, the flange 17 is first compressed to form the seal and thereafter the clamping force is also exerted on the ring 23 which becomes compressed, but owing to its greater hardness sustains by far the major portion of the total force due to the internal pressure on the disk. As a result, there is no danger of the seal being destroyed as by extrusion of the flange material out around the disk. When the flange material becomes softer at increased accumulator temperature, a larger part of the pressure will be sustained by the ring 23, sufficient pressure always being applied to the flange to maintain an effective air seal. When the accumulator is cooled to extremely low temperatures, the flange and ring shrink substantially uniformly because the two have substantially equal coefficients of expansion, and the disk 18 will be allowed to move outwardly under the constant internal pressure to take up this shrinkage. By such automatic adjustment of the effect stop surface, dimensional changes will be accommodated while maintaining an effective clamping force at all times on the flange 17.

Figure 3:
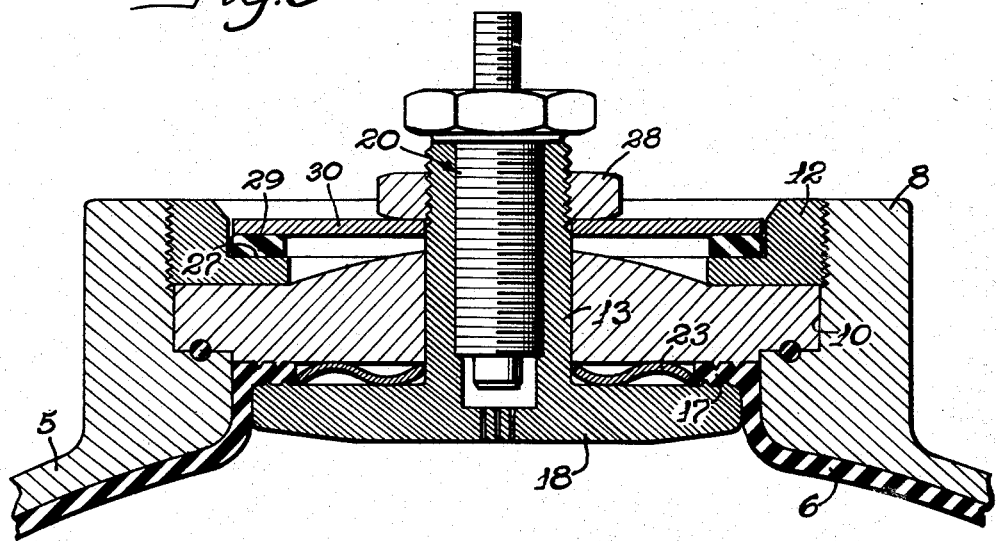
Fig. 3 is a view similar to Fig. 1 showing a modified form of the invention.

In the form shown in Fig. 3, movement of the disk 18 to accommodate changes in the thickness of the flange 17 is provided for by making the stop surface yieldable. In this case, the ring 23 is made of resilient metal and formed with radial convolutions or with circumferentially extending convolutions as shown so as to be yieldable axially in response to changes in the thickness of the flange 17. Thus, shrinkage of the flange transfers a large part of the total pressure to the ring which yields and takes up the shrinkage automatically thus causing continued application to the flange 17 of an ample portion of the total clamping pressure.

Means is provided for holding the disk 18 in place independently of the fluid pressure within the tank so that the flange 17 will be positioned initially and held in place before the accumulator is charged. This means may include a resilient member which is stressed initially and acts continuously on the disk 18 to urge it outwardly toward the cover. In Fig. 1, a spring in the form of a bowed disk 26 is apertured at its center and received on the outwardly projecting threaded end of the hub 13, the concave side of the disk facing inwardly. The periphery of the spring disk rests on a ledge 27 on the ring 12, and stressing of the spring is effected by screwing down a nut 28 threaded onto the outer end of the hub 13. A ring 29 of resilient material such as rubber may be substituted for the spring, as shown in Fig. 3, and compressed between the ledge 27 and a disk 30. Or if desired the ring 29 may be omitted, the disk 30 resting directly on the ledge 27.

I claim as my invention:

1. An accumulator comprising a tank having an opening therein, a cover for said opening providing an inwardly facing annular surface, a bladder of yieldable material in said tank having a neck with an inturned flange seated against said surface, a disk slidable in said cover axially of said opening and bearing against the inner side of said flange whereby to clamp the latter against said surface under the internal tank pressure and take up dimensional changes, a stop disposed between said surface and said disk and operable to sustain a major portion of the pressure applied to the disk, the stop surface being shiftable automatically with dimensional changes in said flange whereby to maintain an effective seal under all conditions, and means acting between said tank and said disk and holding the latter against said flange before said internal pressure is applied.

2. An accumulator comprising a tank having an opening therein, a cover for said opening providing an inwardly facing annular surface, a bladder of yieldable material in said tank having a neck with an inturned flange seated against said surface, a valved stem projecting through and sildably guided in said cover, a disk on the inner end of said stem overlapping said flange and urged toward said cover under the internal pressure within said tank, a resilient member disposed above said cover bearing against said tank, and means on said stem acting on said member to stress the latter and cause said first disk to be urged toward said cover.

3. An accumulator comprising a tank having an opening and an annular surface therearound, a bladder within said tank composed of yieldable material and having a neck extending around said surface, a member movable under the pressure within said bladder and operable to clamp said neck against said surface, and means providing a stop engaged by said member and limiting the clamping force applied to said neck to a small portion of the total pressure applied to said member, the position of said stop shifting automatically with changes in the thickness of said neck to maintain ample clamping pressure on said neck under all conditions.

4. An accumulator comprising a tank with an opening therein, means on the tank providing an annular surface facing inwardly, a bladder of flexible material having a neck extending around and lying against said surface, a member within said bladder mounted for movement along the axis of said opening and actuated by fluid pressure within said tank to clamp said neck against said surface, and means disposed exteriorly of said tank and resiliently urging said member toward said surface independently of said fluid pressure.

5. An accumulator comprising a tank with an opening therein, means on the tank providing an annular surface facing inwardly, a bladder of flexible material having a neck lying against said surface, a member actuated by fluid pressure within said tank to clamp said flange against said surface, and stop means disposed between said surface and said member and operable after initial compression of said flange to sustain a major portion of the total pressure applied to said member.

6. An accumulator comprising a tank with an opening therein, means on the tank providing an annular surface facing inwardly, a bag of flexible material having a neck extending around and lying against said surface, a member actuated by fluid pressure within said tank to clamp said neck against said surface, and means composed of material having approximately the same coefficient of thermal expansion as said neck disposed between said surface and said member, said means being dimensioned to sustain a part of the total pressure applied to said member while permitting shrinkage of said neck to be taken up automatically and clamping pressure to be applied continuously to the neck.

7. An accumulator comprising a tank with an opening therein, means on the tank providing an annular surface facing inwardly, a bladder of flexible material having a neck extending around and lying against said surface, a member actuated by fluid pressure within said tank to clamp said neck against said surface, and means rendered active after a predetermined compression of said neck and operable to thereafter sustain the major portion of the total pressure applied to said member.

8. An accumulator comprising a tank having an opening and an annular surface therearound, a bladder within said tank composed of yieldable material and having a neck extending around said surface, a member movable under the pressure within said bladder and operable to clamp said neck against said surface, and a stop between said member and said surface sustaining a portion of the total pressure exerted on said member and constructed to vary in thickness automatically in accordance with changes in the thickness of said neck whereby to maintain ample clamping pressure on the neck under all conditions.

9. An accumulator comprising a tank having an opening and an annular surface therearound, a bladder within said tank composed of yieldable material and having a neck extending around said surface, a member movable under the pressure within said bladder and operable to clamp said neck against said surface, and a stop between said member and said surface sustaining a portion of the total pressure exerted on said member and composed of a material which varies in thickness with said neck whereby shrinkage of the latter is taken up automatically.

10. An accumulator comprising a tank having an opening and an annular surface therearound, a bladder within said tank composed of yieldable material and having a neck extending around said surface, a member movable under the pressure within said bladder and operable to clamp said neck against said surface, and means providing a stop engaged by said member and limiting the clamping force applied to said neck to a small portion of the total pressure applied to said member, the surfaces of said stop being movable with axial shrinkage of said neck whereby to permit such shrinkage to be taken up automatically by the pressure on said member and ample clamping pressure to be applied to said neck under all conditions.

WELLS A. LIPPINCOTT.